United States Patent [19]

Hausner

[11] Patent Number: 5,131,734
[45] Date of Patent: Jul. 21, 1992

[54] KALEIDOSCOPE WITH IMPROVED OBJECTIVE ILLUMINATION

[76] Inventor: Alan Hausner, 39 Dewey Rd., Cheltenham, Pa. 19012

[21] Appl. No.: 538,646

[22] Filed: Jun. 15, 1990

[51] Int. Cl.⁵ ............................................. G02B 23/00
[52] U.S. Cl. ....................................................... 359/617
[58] Field of Search ................................... 350/4.1, 4.2

[56] References Cited

U.S. PATENT DOCUMENTS

| | | | |
|---|---|---|---|
| 1,914,562 | 6/1933 | Freeland | 350/4.1 X |
| 2,727,426 | 12/1955 | Lopez | 350/4.2 |
| 3,748,013 | 7/1973 | Orans | 350/4.2 |

Primary Examiner—Richard A. Wintercorn

[57] ABSTRACT

A kaleidoscope apparatus comprising an opaque container having an objective end and a viewing end, at least two reflecting surfaces within said container, an opening at the viewing end, and an objective within said objective end, the improvement comprising:

A) said objective end being closed to external light, and
B) an electric light source within said container and between said viewing end and said objective, said light source disposed so as to illuminate said objective.

8 Claims, 3 Drawing Sheets

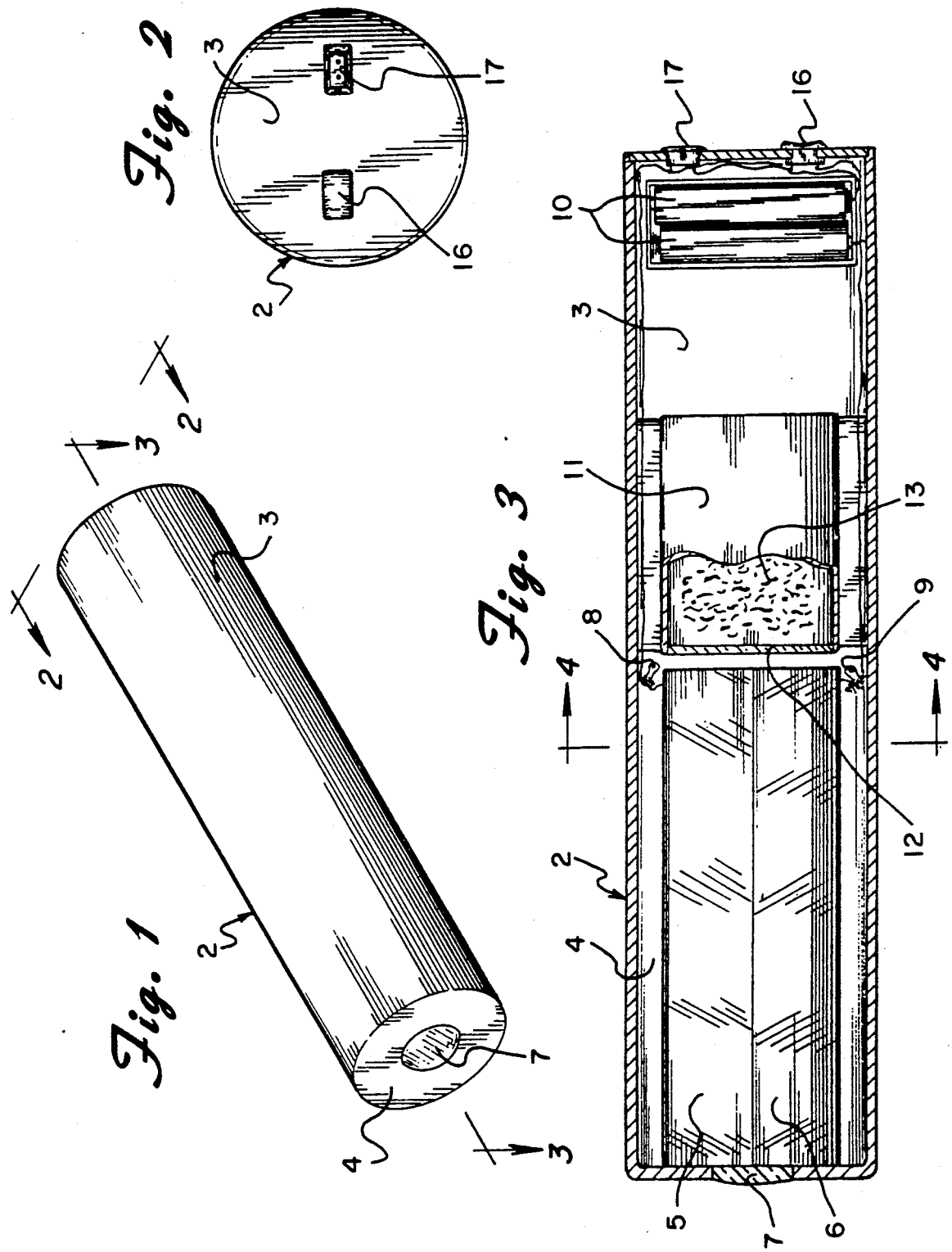

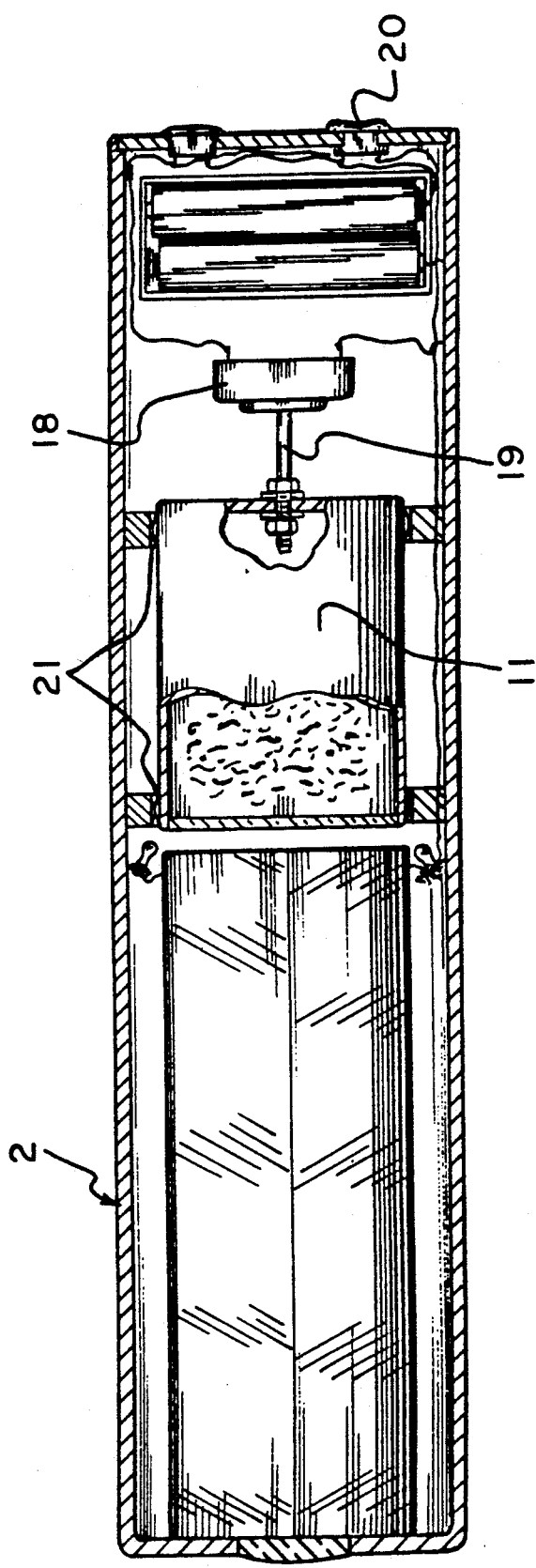

5,131,734

KALEIDOSCOPE WITH IMPROVED OBJECTIVE ILLUMINATION

BACKGROUND OF THE INVENTION

1. Field of the Invention

The present invention relates to kaleidoscopes and more particularly to a kaleidoscope with improved objective illumination.

2. Description of the Prior Art

Kaleidoscopes of various forms and embodiments are known in the art to include assemblies provided with a tubular body part having an eye piece at one end ("viewing end") and a rotatable head at the other end ("objective end"). The body part ("opaque cylinder") has a V-shaped reflector mounted in it to extend between the viewing end and the object enclosure end opposite thereto. The reflector generally defines an opening adjacent the end opposite the eye piece, the field of vision observed through the eye piece being restricted along the reflector. At the object enclosure end usually a transparent enclosure section containing a number of pattern producing objects or particles is provided. As the transparent enclosure is rotated as part of the rotatable head, which is conventionally hand-gripped for direct rotation through a large gripping ring projecting externally relative the body, the pattern producing objects tumble in front of the second opening with the real image observed there combining with the mirror images from the reflector to produce the well-known illusionary image at the eye piece.

Various attempts have been made to vary the conventional kaleidoscope assembly to facilitate its manufacture, to improve the image produced and to make the kaleidoscope physically more attractive to the user. For the most part these assemblies have been complex and expensive to manufacture and yet have not necessarily improved the produced image.

SUMMARY OF THE INVENTION

The present invention provides a kaleidoscope which carries within it its own internal light source for the object enclosure and does not rely on external light. The kaleidoscope apparatus of the invention is improved over the prior art ones in that the use of internal light source provides brighter, more attractive objectives which do not need to be transparent or translucent because the internal light is directed to the surface of the objective and is reflected back to the viewing end or eye piece so the user sees the object enclosure under reflected light rather than outside light source which has typically been used in prior devices.

THE DRAWINGS

Referring to the drawings which disclose one advantageous embodiment of the present invention:

FIG. 1 is a plan view of a kaleidoscope of this invention;

FIG. 2 is a plan view of the object enclosure end of the kaleidoscope of FIG. 1;

FIG. 3 is a partial cross-sectional view of the apparatus of FIG. 1, taken in a plane passing through line 2—2 of FIG. 1;

FIG. 7 is a partial cross-sectional view of a third embodiment of the invention taken in a plane passing through line 2—2 of FIG. 1.

DETAILED DESCRIPTION OF THE INVENTION AND THE PREFERRED EMBODIMENTS

Figure 4:
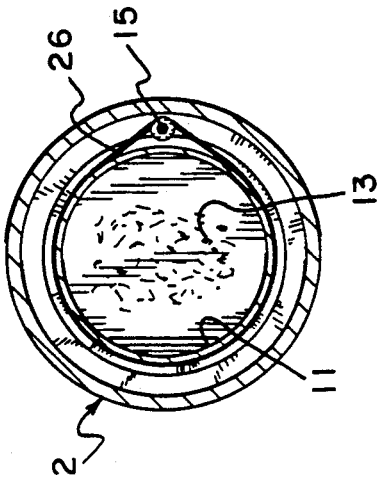
FIG. 4 is a cross-sectional view of the apparatus of FIG. 1 taken in a plane passing through line 4—4 of FIG. 4, looking from the direction of the eye piece.
Figure 6:
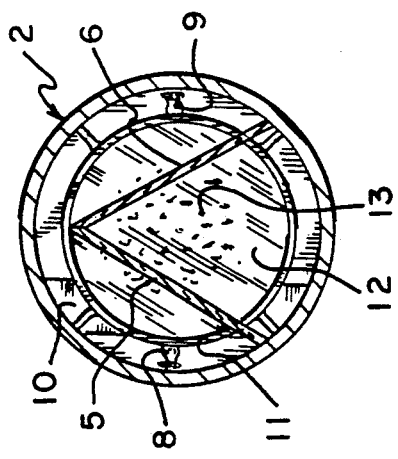
FIG. 6 is a cross-sectional view of the embodiment of FIG. 5, taken in a plane passing through line 6—6 of FIG. 5.
Figure 5:
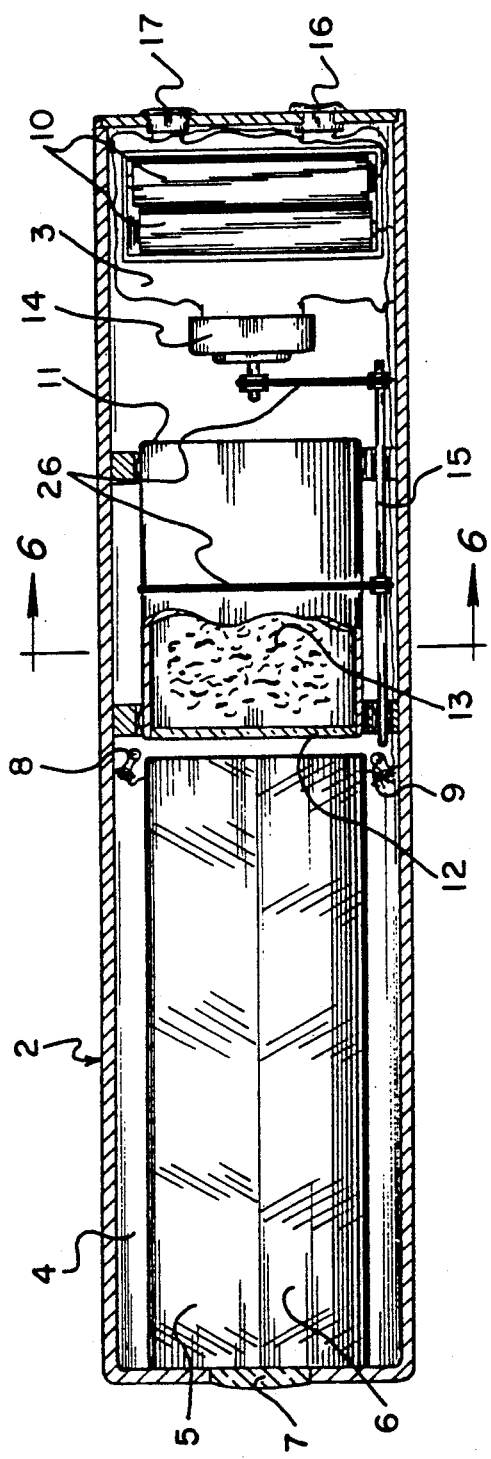
FIG. 5 is a cross-sectional view of an alternative embodiment of the invention taken in a plane passing through line 2—2 of FIG. 1.

Referring to the preferred embodiment of the invention illustrated in the drawings, FIG. 1 shows an apparatus according to the invention wherein an opaque container in the form of a tubular housing 2 which can be made from any number of suitably stiff materials and advantageously is made from cardboard or plastic since they are inexpensive materials and lend themselves to ready external printing and manufacture. A brass tubular housing is preferred when durability and beauty are more important than cost. Glass is another suitable material for the tubular housing 2. The tubular housing 2 (opaque container) is provided with an object enclosure end 3 and a viewing end 4 having an eyepiece 7. As shown in FIGS. 3, 5, and 7, at least two reflecting surfaces 5 and 6 within said opaque container 2, an opening, usually with an eyepiece 7 in said opening at the viewing end 4, and an objective 13 within an objective enclosure 11 which is transparent at its end toward the mirrored surfaces 5 and 6. The object enclosure end 3 is closed to external light as shown in FIG. 2 in which switch 16 and battery recharging socket 17 may be present.

An electric light source, for example light bulbs 8 and 9, is provided within said opaque container 2 between said viewing end 4 and said object enclosure 13, adapted so as to shine light on said objective 13. Preferably a battery 10 to power said bulbs 8 and 9 is placed beyond the object enclosure 11 and is out of sight from the viewing end 4. Light bulbs 8 and 9 are a suitable light source and are disposed so as to illuminate said object enclosure 13.

The objective enclosure 11 is preferably a cylindrical enclosure. Objective enclosure 11 always has a transparent portion 12 adapted so as to permit viewing of said object enclosure 13 from said viewing end 4, said objective enclosure 11 being within said opaque container 2, and functioning to contain said object enclosure 13. A plurality of pattern producing objects 13 can be loosely disposed within transparent objective enclosure. In distinction from the prior art, the pattern producing objects 13 can be opaque, if desired, because this apparatus does not rely on transmission of light through said pattern producing objects.

The preferred embodiment shown in FIG. 5 also contains means such as a motor 14, drive shaft 15, and rubber band or belt 26 assembly to rotate said object enclosure 11 within said opaque container 2. In an alternative embodiment shown in Fig. 7, a direct drive variable motor 18 is connected via shaft 19 to said object enclosure 11 as the means for rotating said object enclosure 11 within said opaque container 2. An electric switch 16 in FIG. 2 is preferably used to turn the light source 8 and 9 on or off and also to turn the motor on or off. In the embodiment of FIG. 7, a variable switch 20 which can vary speed, turn the bulbs on and off, and also switch directions, is provided. A recharging socket 17 in FIG. 2 can be provided at the object enclosure end 3 along with recharging means (not shown) in embodiments wherein a rechargeable battery is used.

From the description herein, it can readily be seen that a unique, attractive, straightforward, economical and efficiently assembled kaleidoscope arrangement is provided. Numerous variations in the construction of the kaleidoscope of this invention, within the scope of the appended claims, will become apparent to those skilled in the art in the light of the foregoing disclosure.

Other features of the present invention will become apparent upon reading the disclosure set forth hereinafter.

I claim:

1. In a kaleidoscope apparatus comprising an opaque container having an object enclosure end and a viewing end, at least two reflecting surfaces within said container, an opening at the viewing end, and an object within said object enclosure end, the improvement comprising:
   A) said object enclosure end being closed to external light, and
   B) an electric source within said container and between said viewing end and said object enclosure, said light source disposed so as to illuminate said object enclosure.

2. Apparatus according to claim 1 further including an object enclosure having a transparent portion adapted so as to permit viewing of said object enclosure from said viewing end, said object enclosure being within said opaque container, and functioning to contain said object enclosure.

3. Apparatus according to claim 2 further including means to move said transparent container within said opaque container.

4. Apparatus according to claim 2 further including a motor and means connecting said motor with said object enclosure so as to rotate said object enclosure within said opaque container.

5. Apparatus according to claim 1 wherein said light source comprises from one to three light bulbs.

6. Apparatus according to claim 1 wherein said light source is connected to a battery which is within said opaque container, and said light source is controlled by an electric switch.

7. Apparatus according to claim 6 wherein said switch controls both said light source and the rotation of said object enclosure.

8. Apparatus according to claim 1 further including recharging means and a socket at said object enclosure end for use in recharging said battery.

* * * * *